(12) United States Patent
Nagashima et al.

(10) Patent No.: US 10,138,860 B2
(45) Date of Patent: *Nov. 27, 2018

(54) FIRING FRACTION TRANSITION CONTROL

(71) Applicant: Tula Technology, Inc., San Jose, CA (US)

(72) Inventors: Masaki Nagashima, Pacific Grove, CA (US); Mohammad R. Pirjaberi, San Jose, CA (US); Louis J. Serrano, Los Gatos, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/697,639

(22) Filed: Sep. 7, 2017

(65) Prior Publication Data
US 2017/0370342 A1 Dec. 28, 2017

Related U.S. Application Data

(63) Continuation-in-part of application No. 15/147,690, filed on May 5, 2016, now Pat. No. 9,777,658.
(Continued)

(51) Int. Cl.
*F02P 5/145* (2006.01)
*F02D 13/02* (2006.01)
(Continued)

(52) U.S. Cl.
CPC ............ *F02P 5/145* (2013.01); *F02D 11/105* (2013.01); *F02D 13/02* (2013.01); *F02D 17/02* (2013.01); *F02D 37/02* (2013.01); *F02D 41/0002* (2013.01); *F02D 41/0087* (2013.01); *F02D 2041/001* (2013.01); *F02D 2041/141* (2013.01);
(Continued)

(58) Field of Classification Search
CPC .......... F02P 5/145; F02D 17/02; F02D 13/02; F02D 13/00; F02D 37/02; F02D 41/0002; F02D 41/18; F02D 41/3064; F02D 2041/141; F02D 2200/10; F02D 2200/0406; F02D 2200/1002; F02D 2250/18; F02D 2250/21
USPC ......... 123/399, 436, 90.15, 568.11; 701/103, 701/110; 73/114.32, 114.33, 114.37
See application file for complete search history.

(56) References Cited

U.S. PATENT DOCUMENTS 4,129,109 A 12/1978 Matsumoto
4,274,382 A 6/1981 Sugasawa et al.
(Continued)

OTHER PUBLICATIONS

International Search Report dated Mar. 10, 2017 from International Application No. PCT/US2016/063470.
(Continued)

*Primary Examiner* — Hai Huynh
(74) *Attorney, Agent, or Firm* — Beyer Law Group LLP

(57) ABSTRACT

A variety of methods and arrangements are described for controlling transitions between effective firing fractions during dynamic firing level modulation operation of an engine in order to help reduce undesirable NVH consequences and otherwise smooth the transitions. In general, both feed forward and feedback control are utilized in the determination of the effective firing fractions during transitions such that the resulting changes in the effective firing fraction better track cylinder air charge changing dynamics associated with the transition.

29 Claims, 8 Drawing Sheets

Related U.S. Application Data

(60) Provisional application No. 62/296,451, filed on Feb. 17, 2016.

(51) Int. Cl.
  *F02D 37/02* (2006.01)
  *F02D 41/00* (2006.01)
  *F02D 17/02* (2006.01)
  *F02D 11/10* (2006.01)
  *F02D 41/14* (2006.01)

(52) U.S. Cl.
  CPC ........ *F02D 2041/1431* (2013.01); *F02D 2200/0406* (2013.01); *F02D 2200/1004* (2013.01); *F02D 2250/21* (2013.01); *Y02T 10/42* (2013.01)

(56) References Cited

U.S. PATENT DOCUMENTS

| | | |
|---|---|---|
| 4,276,863 A | 7/1981 | Sugasawa et al. |
| 4,337,740 A | 7/1982 | Sugasawa et al. |
| 4,391,255 A | 7/1983 | Staerzl |
| 4,434,767 A | 3/1984 | Kohama et al. |
| 4,489,695 A | 12/1984 | Kohama et al. |
| 4,509,488 A | 4/1985 | Forster et al. |
| 4,541,387 A | 9/1985 | Morikawa |
| 5,337,720 A | 8/1994 | Murakami et al. |
| 5,374,224 A | 12/1994 | Huffmaster et al. |
| 5,377,631 A | 1/1995 | Schechter |
| 5,408,966 A | 4/1995 | Lipinski et al. |
| 5,408,974 A | 4/1995 | Lipinski et al. |
| 5,540,633 A | 7/1996 | Yamanaka et al. |
| 5,584,266 A | 12/1996 | Motose et al. |
| 5,584,281 A | 12/1996 | Katoh |
| 5,692,471 A | 12/1997 | Zhang |
| 5,720,257 A | 2/1998 | Motose et al. |
| 5,778,858 A | 7/1998 | Garabedian |
| 5,803,040 A | 9/1998 | Biesinger et al. |
| 5,975,052 A | 11/1999 | Moyer |
| 6,138,636 A | 10/2000 | Kohno et al. |
| 6,158,411 A | 12/2000 | Morikawa |
| 6,408,625 B1 | 6/2002 | Woon et al. |
| 6,484,677 B2 | 11/2002 | Leone et al. |
| 6,532,944 B1 | 3/2003 | Leone et al. |
| 6,615,776 B1 | 9/2003 | Von Andrian-Werburg |
| 6,615,804 B2 | 9/2003 | Matthews et al. |
| 6,619,258 B2 | 9/2003 | McKay et al. |
| 6,655,353 B1 | 12/2003 | Rayl |
| 6,735,938 B2 | 5/2004 | Surnilla |
| 6,736,108 B2 | 5/2004 | Rayl et al. |
| 6,978,204 B2 | 12/2005 | Surnilla et al. |
| 7,028,670 B2 | 4/2006 | Doering |
| 7,032,545 B2 | 4/2006 | Lewis et al. |
| 7,044,101 B1 | 5/2006 | Duty et al. |
| 7,063,062 B2 | 6/2006 | Lewis et al. |
| 7,066,136 B2 | 6/2006 | Ogiso |
| 7,086,386 B2 | 8/2006 | Doering |
| 7,231,907 B2 | 6/2007 | Bolander et al. |
| 7,275,518 B1 | 10/2007 | Gartner et al. |
| 7,426,915 B2 | 9/2008 | Gibson et al. |
| 7,503,312 B2 | 3/2009 | Surnilla et al. |
| 7,532,972 B2 | 5/2009 | Kolmanovsky et al. |
| 7,571,707 B2 | 8/2009 | Gibson et al. |
| 7,577,511 B1 | 8/2009 | Tripathi et al. |
| 7,785,230 B2 | 8/2010 | Gibson et al. |
| 7,899,607 B2 | 3/2011 | Shin et al. |
| 7,930,087 B2 | 4/2011 | Gibson et al. |
| 8,099,224 B2 | 1/2012 | Tripathi et al. |
| 8,150,605 B2 | 4/2012 | Doering et al. |
| 8,215,284 B2 | 7/2012 | Suzuki et al. |
| 8,839,766 B2 | 9/2014 | Serrano et al. |
| 8,869,773 B2 | 10/2014 | Tripathi et al. |
| 9,020,735 B2 | 4/2015 | Tripathi et al. |
| 9,086,020 B2 | 7/2015 | Tripathi et al. |
| 9,200,575 B2 | 12/2015 | Shost et al. |
| 9,200,587 B2 | 12/2015 | Serrano et al. |
| 9,528,446 B2 | 12/2016 | Pirjaberi et al. |
| 9,745,905 B2 | 8/2017 | Pirjaberi et al. |
| 9,878,718 B2 * | 1/2018 | Serrano ............ B60W 30/188 |
| 9,926,868 B2 * | 3/2018 | Serrano ............ F02D 41/0087 |
| 2002/0096134 A1 | 7/2002 | Michelini et al. |
| 2003/0213467 A1 | 11/2003 | Rayl et al. |
| 2006/0005811 A1 | 1/2006 | Hartmann |
| 2006/0130814 A1 | 6/2006 | Bolander et al. |
| 2008/0066450 A1 | 3/2008 | Surnilla et al. |
| 2010/0043744 A1 | 2/2010 | Suzuki et al. |
| 2010/0050993 A1 | 3/2010 | Zhao et al. |
| 2014/0041625 A1 | 2/2014 | Pirjaberi et al. |
| 2014/0053802 A1 | 2/2014 | Rayl |
| 2014/0053803 A1 | 2/2014 | Rayl |
| 2014/0053804 A1 | 2/2014 | Rayl |
| 2014/0069178 A1 | 3/2014 | Beikmann |
| 2014/0069378 A1 | 3/2014 | Burleigh et al. |
| 2014/0069379 A1 | 3/2014 | Beikmann |
| 2014/0069381 A1 | 3/2014 | Beikmann |
| 2014/0090623 A1 | 4/2014 | Beikmann |
| 2014/0090624 A1 | 4/2014 | Verner |
| 2014/0102411 A1 | 4/2014 | Brennan |
| 2014/0190449 A1 | 7/2014 | Phillips |
| 2014/0207359 A1 | 7/2014 | Phillips |
| 2014/0350823 A1 | 11/2014 | Glugla |
| 2015/0152796 A1 | 6/2015 | Zhang |
| 2015/0260117 A1 | 9/2015 | Shost et al. |
| 2015/0354470 A1 | 12/2015 | Li et al. |
| 2016/0003168 A1 | 1/2016 | Leone et al. |
| 2017/0009729 A1 | 1/2017 | Younkins et al. |
| 2017/0067401 A1 | 3/2017 | Pirjaberi et al. |
| 2017/0234254 A1 | 8/2017 | Nagashima et al. |
| 2017/0306864 A1 | 10/2017 | Pirjaberi et al. |
| 2017/0342920 A1 | 11/2017 | Pirjaberi et al. |
| 2018/0043893 A1 * | 2/2018 | Serrano ............ B60W 30/1882 |

OTHER PUBLICATIONS

Written Opinion dated Mar. 10, 2017 from International Application No. PCT/US2016/063470.
Nagashima et al., U.S. Appl. No. 15/918,284, filed Mar. 12, 2018.

* cited by examiner

FIRING FRACTION TRANSITION CONTROL

CROSS REFERENCE TO RELATED APPLICATIONS

This application is a Continuation-in-Part of U.S. patent application Ser. No. 15/147,690, filed May 5, 2016, which claims priority of U.S. Provisional Application No. 62/296,451, filed Feb. 17, 2016, each of which is incorporated herein by reference in its entirety.

FIELD OF THE INVENTION

The present invention relates generally to methods and arrangements for controlling transitions between displacements during operation of an engine. Some described embodiments are particularly well adapted to controlling transitions between firing fractions during skip fire or other dynamic firing level modulation operation of an engine.

BACKGROUND

Fuel efficiency of many types of internal combustion engines can be substantially improved by varying the displacement of the engine. This allows for the full torque to be available when required, yet can significantly reduce pumping losses and improve thermodynamic efficiency through the use of a smaller displacement when full torque is not required. The most common method of varying the displacement today is deactivating a group of cylinders substantially simultaneously. In this approach no fuel is delivered to the deactivated cylinders and their associated intake and exhaust valves are kept closed as long as the cylinders remain deactivated.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired during one engine cycle and then may be skipped during the next engine cycle and then selectively skipped or fired during the next. Skip fire engine operation is distinguished from conventional variable displacement engine control in which a designated set of cylinders are deactivated substantially simultaneously and remain deactivated as long as the engine remains in the same variable displacement mode. Thus, the sequence of specific cylinders firings will always be exactly the same for each engine cycle during operation in a variable displacement mode (so long as the engine remains in the same displacement mode), whereas that is often not the case during skip fire operation. For example, an 8 cylinder variable displacement engine may deactivate half of the cylinders (i.e. 4 cylinders) so that it is operating using only the remaining 4 cylinders. Commercially available variable displacement engines available today typically support only two or at most three fixed mode displacements.

In general, skip fire engine operation facilitates finer control of the effective engine displacement than is possible using a conventional variable displacement approach. For example, firing every third cylinder in a 4 cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences or patterns. The Applicant has filed a number of patents describing various approaches to skip fire control.

In some applications referred to as dynamic multi-level skip fire, individual working cycles that are fired may be purposely operated at different cylinder outputs levels—that is, using purposefully different air charge and corresponding fueling levels. By way of example, U.S. Pat. No. 9,399,964 describes some such approaches.

Many skip fire controllers are arranged to provide a set of available firing patterns, sequences or firing fractions. In some circumstances the set of available firing patterns or fractions will vary as a function of various operating parameters such as engine load or speed. Typically the available firing patterns are selected, in part, based on their noise, vibration and harshness (NVH) characteristics. Although careful selection of the available firing patterns helps facilitate smooth operations, transitions between different firing patterns can cause undesirable NVH. Therefore, there are continuing efforts to provide improved schemes for transitioning between different firing patterns or different firing fractions.

SUMMARY

A variety of methods and arrangements are described for controlling transitions between effective firing fractions during dynamic firing level modulation operation of an engine in order to help reduce undesirable NVH consequences and otherwise smooth the transitions. In general, both feed forward and feedback control are utilized in the determination of the firing fractions during transitions such that the resulting changes in the firing fraction better track cylinder air charge changing dynamics associated with the transition.

In some embodiments, a feed forward adjusted firing fraction is determined during effective firing fraction transitions that at least partially compensates for engine dynamics that occur during the transition. A firing fraction correction factor indicative of a difference between an actual engine output and the requested engine output is also determined. The commanded firing fraction during the transition is based on a combination of the adjusted feed forward firing fraction and the firing fraction correction factor. In various other embodiments, the feed forward transition adjustments and the feedback based corrections may be used independently.

In general, the feed forward adjusted firing fraction accounts for cylinder air charge changing dynamics. In various embodiments, the engine dynamics accounted for by the feed forward adjusted firing fraction may include manifold filling/emptying dynamics, camshaft phase shifting dynamics or other component dynamics that affect the cylinder air charge including supercharging, turbo-charging, exhaust gas recirculation, etc.

In some implementations the feed forward firing adjustments are based at least in part on at least one of an intake manifold pressure model that determines an estimated intake manifold pressure during transitions and a cam phase dynamics model that determines an estimated cam phase during transitions. In other embodiments, predefined or variable filters may be used.

In some embodiments the firing fraction correction factor is determined based at least in part on at least one of a sensed intake manifold mass air flow (MAF), a sensed intake manifold pressure (MAP) and/or a sensed camshaft phase.

In some embodiments, the commanded firing fraction is an input to a sigma delta based firing timing determining unit that determines the timing of firings during skip fire operation of the engine or other units that effectively tracks the portion of a firing that has been requested but not delivered, or that has been delivered but not requested.

Various controllers configured to manage firing fraction transitions are also described. In some embodiments, the engine controller includes a firing fraction determining unit, a transition adjustment unit and a firing timing determining unit. The firing fraction determining unit is arranged to determine a desired operational firing fraction suitable for delivering a desired engine output. Since the desired engine output will change over time, the firing fraction determining unit sometimes requests changes in the desired operational firing fraction which often will also involve changes in the desired cylinder air charge. The transition adjustment unit is arranged to adjust the desired operational firing fraction during transitions in a manner that accounts for air charge changing dynamics. The firing timing determining unit is arranged to determine a skip fire firing sequence that delivers a commanded firing fraction.

In some embodiments, the transition adjustment unit includes a feed forward firing fraction determining unit and an error determining unit. The feed forward firing fraction determining unit determines a feed forward adjusted firing fraction that at least partially compensates for engine dynamics that occur during the change from a first operational firing fraction to a target operational firing fraction. The error determining unit determines a firing fraction correction factor based at least in part upon a difference between an actual engine output and the requested engine output. The transition adjustment unit is further configured to determine a commanded firing fraction during transitions based at least in part on the feed forward adjusted firing fraction and the firing fraction correction factor.

In another aspect, the engine controller may include a mode switching unit arranged to cause the desired operational firing fraction to be used as the commanded firing fraction during steady state skip fire engine operation and an output of the transition adjustment unit to be used as the commanded firing fraction during firing fraction transitions.

BRIEF DESCRIPTION OF THE DRAWINGS

The invention and the advantages thereof, may best be understood by reference to the following description taken in conjunction with the accompanying drawings in which:

FIG. 6(a) graphs the change in firing fraction. FIG. 6(b) graphs the requested and estimated actual torques. FIG. 6(c) graphs the measured manifold pressure and cam phase. FIG. 6(d) graphs the actual engine speed.

FIG. 7(a) graphs the change in firing fraction. FIG. 7(b) graphs the requested and estimated actual torques. FIG. 7(c) graphs the measured manifold pressure and cam phase. FIG. 7(d) graphs the actual engine speed.

FIG. 8(a) graphs the change in firing fraction. FIG. 8(b) graphs the requested and estimated actual torques. FIG. 8(c) graphs the measured manifold pressure and cam phase. FIG. 8(d) graphs the actual engine speed.

In the drawings, like reference numerals are sometimes used to designate like structural elements. It should also be appreciated that the depictions in the figures are diagrammatic and not to scale.

DETAILED DESCRIPTION

When a transition is made between different firing fractions (or variable displacement states) there is typically a corresponding need or desire to change certain engine operating parameters such as air charge, fuel charge, spark timing, etc. This is because at any particular firing density, there will be associated operating parameters that are appropriate to most efficiently deliver the desired engine output. Therefore, when a change is made in the firing density, it is typically desirable to substantially simultaneously adjust one or more selected engine operating parameters so that the desired engine output is maintained at the new firing fraction. Without such an adjustment, operating at the same engine settings would typically result in the generation of more torque than desired when the firing density is increased, and less torque than desired when the firing density is reduced.

From a control standpoint, the firing density can be changed very quickly by simply altering the selection of the specific cylinders to be fired—however corresponding changes in the air charge tend to be realized more slowly due to the latencies inherent in filling or emptying the intake manifold, changing camshaft phase, etc. This is particularly noticeable when the desired firing fraction changes significantly, as for example from $1/2$ to 1 or from $1/3$ to $2/3$, which requires correspondingly large changes in air charge. Generally, any mismatch between the firing density and the targeted cylinder air charge during a transition, will result in a low frequency torque disturbance (unless otherwise compensated for), which may be perceived as NVH. If the mismatch would result in a torque surge, then the spark timing can be retarded to maintain the desired torque. However, an undesirable side effect of retarding spark to reduce engine output is that retarding spark will generally reduce fuel efficiency. Also, excessive spark retard will lead to misfires further reducing efficiency and potentially adversely affecting the engine performance.

The Applicant has previously described a variety of techniques for transitioning between different firing fractions. By way of example, various transition control schemes are described in U.S. Pat. No. 9,086,020 and co-pending application Ser. No. 14/857,371, each of which is incorporated herein by reference. Although these and other existing transition schemes work well, there are continuing efforts to provide improved controllers and control schemes for transitioning between different firing patterns or different firing fractions.

Figure 1:
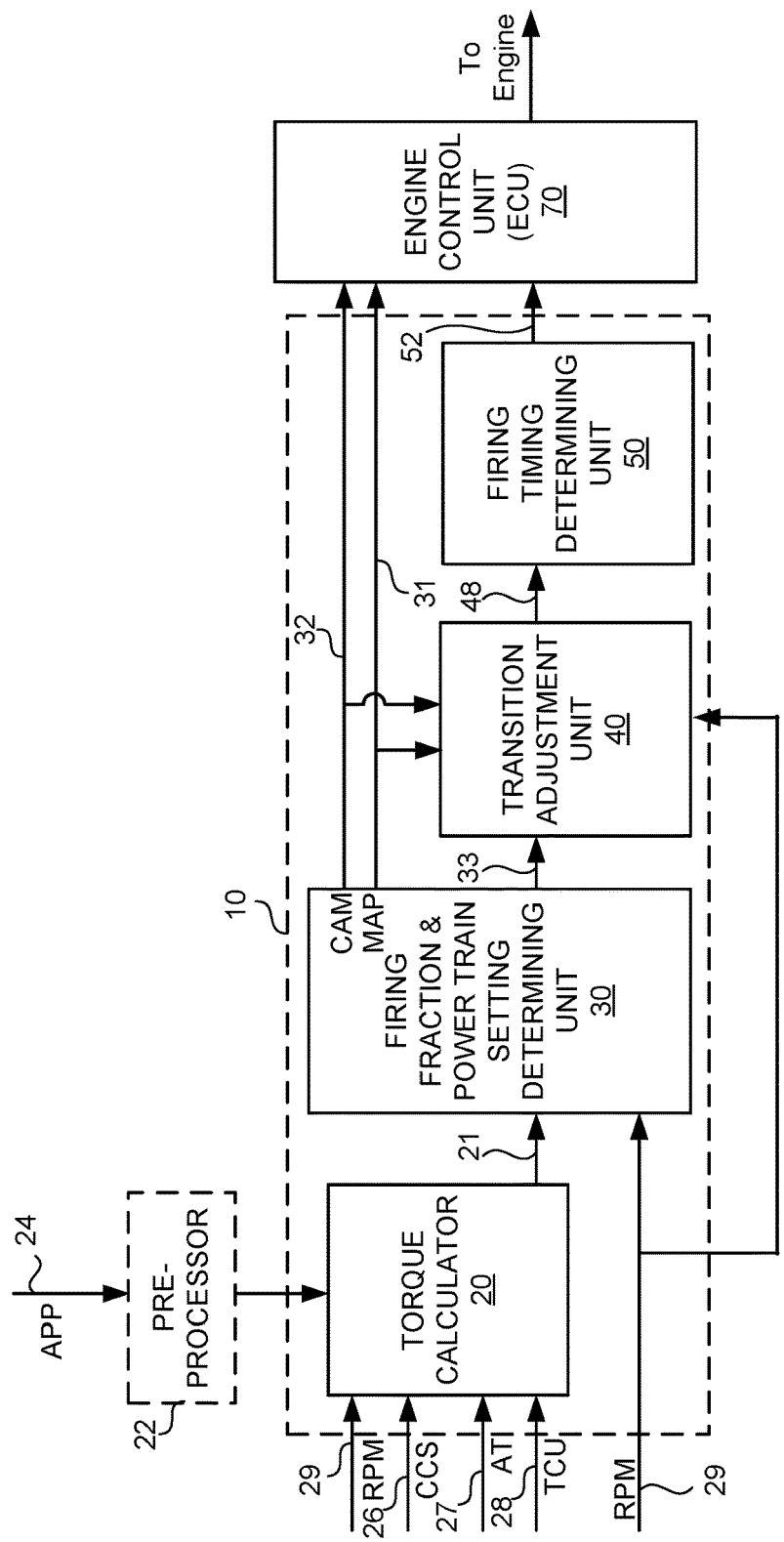
FIG. 1 is a functional block diagram of a skip fire controller having a transition management control unit.

The Applicant has previously described a variety of skip fire controllers. A suitable skip fire controller 10 is functionally illustrated in FIG. 1. The illustrated skip fire controller 10 includes a torque calculator 20, a firing fraction and power train settings determining unit 30, a transition adjustment unit 40, and a firing timing determination unit 50. For the purposes of illustration, skip fire controller 10 is shown separately from engine control unit (ECU) 70 which implements the commanded firings and provides the detailed component controls. However, it should be appreciated that in many embodiments the functionality of the skip fire controller 10 may be incorporated into the ECU 70. Indeed incorporation of the skip fire controller into an ECU or power train control unit is expected to be the most common implementation.

The torque calculator 20 is arranged to determine the desired engine torque at any given time based on a number of inputs. The torque calculator outputs a requested torque 21 to the firing fraction and power train settings determining unit 30. The firing fraction and power train settings determining unit 30 is arranged to determine a firing fraction that is suitable for delivering the desired torque based on the current operating conditions and outputs a desired operational firing fraction 33 that is appropriate for delivering the desired torque. Unit 30 also determines selected engine operating settings (e.g., manifold pressure 31, cam timing 32, air mass flow rate, fuel injection characteristics, spark timing, etc.) that are appropriate to deliver the desired torque at the designated firing fraction.

In many implementations, the firing fraction and engine settings determining unit selects between a set of predefined firing fractions which are determined to have relatively good NVH characteristics. In such embodiments, there are transitions between desired operational firing fractions during normal engine operation. It has been observed that transitions between operational firing fractions are a source of undesirable NVH. Transition adjustment unit 40 is arranged to adjust the commanded firing fraction during transitions in a manner that helps mitigate some of the NVH associated during the transition.

The firing timing determining unit 50 is responsible for determining the specific timing of firing to deliver the desired firing fraction. The firing sequence can be determined using any suitable approach. In some preferred implementations, the firing decisions are made dynamically on an individual firing opportunity by firing opportunity basis, which allows desired changes to be implemented very quickly. A variety of firing timing determining units that are well suited for determining appropriate firing sequences based on a potentially time varying requested firing fraction or engine output have been previously described by the Applicant. Many such firing timing determining units are based on a sigma delta converter, which is well suited for making firing decisions on a firing opportunity by firing opportunity basis. In other implementations, pattern generators or predefined patterns may be used to facilitate delivery of the desired firing fraction.

The torque calculator 20 receives a number of inputs that may influence or dictate the desired engine torque at any time. In automotive applications, one of the primary inputs to the torque calculator is the accelerator pedal position (APP) signal 24 which indicates the position of the accelerator pedal. In some implementations the accelerator pedal position signal is received directly from an accelerator pedal position sensor (not shown) while in others an optional preprocessor 22 may modify the accelerator pedal signal prior to delivery to the skip fire controller 10. Other primary inputs may come from other functional blocks such as a cruise controller (CCS command 26), the transmission controller (AT command 27), a traction control unit (TCU command 28), etc. There are also a number of factors such as engine speed that may influence the torque calculation. When such factors are utilized in the torque calculations, the appropriate inputs, such as engine speed (RPM signal 29) are also provided or are obtainable by the torque calculator as necessary.

Further, in some embodiments, it may be desirable to account for energy/torque losses in the drive train and/or the energy/torque required to drive engine accessories, such as the air conditioner, alternators/generator, power steering pump, water pumps, vacuum pumps and/or any combination of these and other components. In such embodiments, the torque calculator may be arranged to either calculate such values or to receive an indication of the associated losses so that they can be appropriately considered during the desired torque calculation.

The nature of the torque calculation will vary with the operational state of the vehicle. For example, during normal operation, the desired torque may be based primarily on the driver's input, which may be reflected by the accelerator pedal position signal 24. When operating under cruise control, the desired torque may be based primarily on the input from a cruise controller. When a transmission shift is imminent, a transmission shifting torque calculation may be used to determine the desired torque during the shifting operation. When a traction controller or the like indicates a potential loss of traction event, a traction control algorithm may be used to determine the desired torque as appropriate to handle the event. In some circumstances, depression of a brake pedal may invoke specific engine torque control. When other events occur that require measured control of the engine output, appropriate control algorithms or logic may be used to determine the desired torque throughout such events. In any of these situations, the required torque determinations may be made in any manner deemed appropriate for the particular situation. For example, the appropriate torque determinations may be made algorithmically, using lookup tables based on current operating parameters, using appropriate logic, using set values, using stored profiles, using any combinations of the foregoing and/or using any other suitable approach. The torque calculations for specific applications may be made by the torque calculator itself, or may be made by other components (within or outside the ECU) and simply reported to the torque calculator for implementation.

The firing fraction and power train settings determining unit 30 receives requested torque signal 21 from the torque calculator 20 and other inputs such as engine speed 29 and various power train operating parameters and/or environmental conditions that are useful in determining an appropriate operational firing fraction 33 to deliver the requested torque under the current conditions. The firing fraction is indicative of the fraction or percentage of firings that are to be used to deliver the desired output. Often, the firing fraction determining unit will be constrained to a limited set of available firing fractions, patterns or sequences that have been selected based at least in part on their relatively more desirable NVH characteristics (collectively sometimes referred to herein generically as the set of available firing fractions). There are a number of factors that may influence the set of available firing fractions. These typically include the requested torque, cylinder load, engine speed (e.g. RPM) and current transmission gear. They may potentially also include various environmental conditions such as ambient pressure or temperature and/or other selected power train parameters. The firing fraction determining aspect of unit 30 is arranged to select the desired operational firing fraction 33 based on such factors and/or any other factors that the skip fire controller designer may consider important. By way of example, a few suitable firing fraction determining units are described in co-pending application Ser. Nos. 13/654,244; 13/654,248, 13/963,686 and 14/638,908, each of which are incorporated herein by reference.

The number of available firing fractions/patterns and the operating conditions during which they may be used may be widely varied based on various design goals and NVH considerations. In one particular example, the firing fraction determining unit may be arranged to limit available firing fractions to a set of 29 possible operational firing fractions— each of which is a fraction having a denominator of 9 or less—i.e., 0, 1/9, 1/8, 1/7, 1/6, 1/5, 2/9, 1/4, 2/7, 1/3, 3/8, 2/5, 3/7, 4/9, 1/2, 5/9, 4/7, 3/5, 5/8, 2/3, 5/7, 3/4, 7/9, 4/5, 5/6, 6/7, 7/8, 8/9 and 1. However, at certain (indeed most) operation conditions, the set of available firing fraction may be reduced and sometimes the available set is greatly reduced. In general, the set of available firing fractions tends to be smaller in lower gears and at lower engine speeds. For example, there may be operating ranges (e.g. near idle and/or in first gear) where the set of available firing fractions is limited to just two available fractions—(e.g., ½ or 1) or to just 4 possible firing fractions—e.g., 1/3, 1/2, 2/3 and 1. Of course, in other embodiments, the permissible firing fractions/patterns for different operating conditions may be widely varied.

Since the available set of firing fractions is limited, various power train operating parameters such as mass air charge (MAC) and/or spark timing will typically need to be varied to insure that the actual engine output matches the desired output. In the embodiment illustrated in FIG. 1, this functionality is incorporated into the engine settings component of unit 30. In other embodiments, it can be implemented in the form of a power train parameter adjusting module (not shown) that cooperates with the firing fraction calculator 30. Either way, the engine settings component of unit 30 or the power train parameter adjusting module determines selected power train parameters that are appropriate to insure that the actual engine output substantially equals the requested engine output at the commanded firing fraction. Depending on the nature of the engine, the air charge can be controlled in a number of ways. Most commonly, the air charge is controlled by controlling the intake manifold pressure and/or a cam phase (when the engine has one or more cam phaser or other mechanism for controlling valve timing). However, when available, other mechanism such as adjustable valve lifters, air pressure boosting devices like turbochargers or superchargers, air dilution mechanism such as exhaust gas recirculation or other mechanisms can also be used to help adjust the air charge. In the illustrated embodiment, the desired air charge is indicated in terms of a desired intake manifold pressure (MAP) 31 and a desired cam phase setting 32. Of course, when other components are used to help regulate air charge, there may be indicated values for those components as well.

In some control schemes air charge may be expressed in terms of an air mass flow rate (MAF). It should be appreciated that the control methods described herein work equally well with engine control based on mass air charge (MAC) or mass air flow (MAF).

The firing timing determining module 50 is arranged to issue a sequence of firing commands 52 that cause the engine to deliver the percentage of firings dictated by a commanded firing fraction 48. The firing timing determining module 50 may take a wide variety of different forms. By way of example, sigma delta convertors work well as the firing timing determining module 50. A number of the assignee's patents and patent applications describe various suitable firing timing determining modules, including a wide variety of different sigma delta based converters that work well as the firing timing determining module. See, e.g., U.S. Pat. Nos. 7,577,511, 7,849,835, 7,886,715, 7,954,474, 8,099,224, 8,131,445, 8,131,447, 8,839,766 and 9,200,587. The sequence of firing commands (sometimes referred to as a drive pulse signal 52) outputted by the firing timing determining module 50 may be passed to an engine control unit (ECU) 70 or another module such as a combustion controller (not shown in FIG. 1) which orchestrates the actual firings. A significant advantage of using a sigma delta converter or an analogous structure is that it inherently includes an accumulator function that tracks the portion of firing that have been requested but not yet delivered. Such an arrangement helps smooth transitions by accounting for the effects of previous fire/no fire decisions.

When a change in firing fraction is commanded by unit 30, it will often (indeed typically) be desirable to simultaneously command a change in the cylinder mass air charge (MAC). As discussed above changes in the air charge tend to be realized more slowly than changes in firing fraction can be implemented due to the latencies inherent in filling or emptying the intake manifold and/or adjusting the cam phase. Transition adjustment unit 40 is arranged to adjust the commanded firing fraction during transitions in a manner that mitigates unintended torque surges or dips during the transition.

Figure 2:
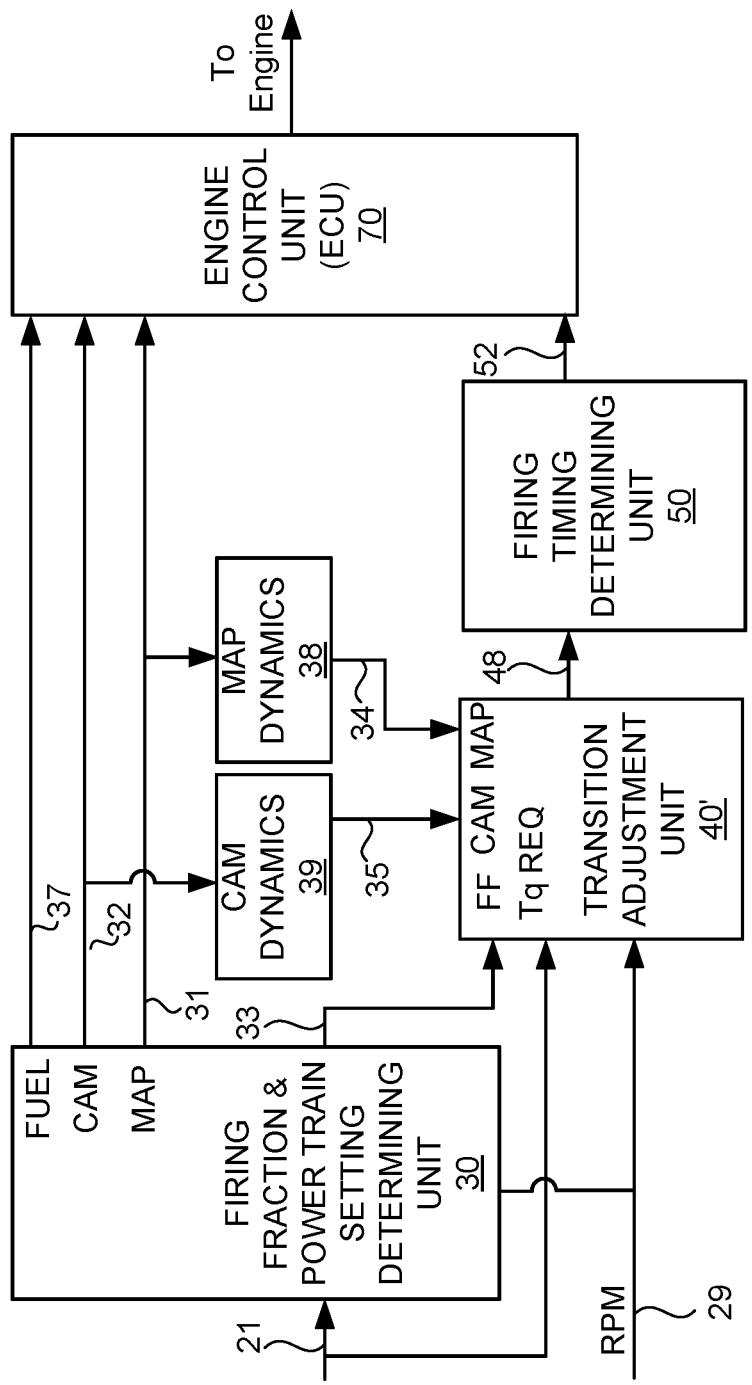
FIG. 2 is a functional block diagram highlighting selected control functionality of a transition management control unit that utilizes feed forward control to determine the transitory operational firing fraction during transitions between different commanded firing fractions.

Referring next to FIG. 2, a feed forward transition approach will be described. In the illustrated embodiment, the firing fraction and power train settings determining unit 30 determines the desired operational firing fraction 33, as well as accompanying desired engine settings including intake manifold pressure (MAP) 31, cam phase setting 32 (when the engine has an adjustable phase camshaft), and optionally, a nominal desired fuel charge 37. The manifold filling and cam phase shifting dynamics can typically be modeled relatively effectively. Thus, an estimated intake manifold pressure (MAP) 34 can readily be determined at any point following a change in commanded intake manifold pressure based upon the known manifold dynamics. Similarly, the estimated cam phase (CAM) 35 at any time following a change in commanded cam phase can also readily be determined based upon the commanded cam dynamics. In the feed forward control approach, these estimated values for manifold pressure 34 and cam phase 35 are used by the transition adjustment unit 40' during transitions to determine an adjusted firing fraction which is used as the commanded firing fraction 48 throughout the transition. That is, the transition adjustment unit 40' knows that immediately after a change in firing fraction is commanded by firing fraction and power train settings determining unit 30, the actual manifold pressure will likely be different than the commanded (target) manifold pressure due to the inherent latency of the manifold filling/emptying dynamics and/or the actual cam phase may be different than the target cam phase due to cam phasing dynamics. Therefore, during the transitional period in which the air charge is changing to the new commanded level, the transition adjustment unit 40' utilizes the estimated manifold pressure 34 and the estimated cam phase 35 to determine an adjusted firing fraction that is expected to deliver the desired torque. This adjusted firing fraction is sent to the firing timing determining unit 50 as the commanded firing fraction throughout the transition. In this manner, the commanded firing fraction 48 will be ramped through the transition in a manner that tracks predicted changes in the manifold pressure and any other relevant engine settings such as cam phase, valve lift, air dilution, etc. This ramping helps smooth torque output through the transition, which has the benefit of reducing NVH associated with the transition.

In the schematic illustration of FIG. 2, MAP dynamics modeling block 38 determines the predicted (estimated) manifold pressure 34 and CAM dynamics modeling block 39 determines the predicted (estimated) cam phase. Although shown as separate blocks to facilitate explanation, it should be appreciated that the functionality of modeling blocks 38 and 39 may readily be incorporated into the transition adjustment unit 40', a separate power train parameter setting module, the ECU or any other suitable component. When other devices are used that affect the air charge such as adjustable valve lifters, air pressure boosting devices like turbochargers or superchargers, air dilution mechanisms such as exhaust gas recirculation, etc., appropriate modeling blocks can be included for those devices as well. Some devices such as air boosters (e.g., turbo-charges, air chargers) and external exhaust gas recirculation systems may affect the manifold pressure and may therefore be modeled by MAP dynamics modeling block 38. Alternatively, when appropriate, they may be modeled separately. In the illustrated embodiment, the desired air charge is indicated in terms of a desired intake manifold pressure (MAP) 31 and a desired cam phase setting 32. Of course, when other components are used to help regulate air charge, there may be indicated values for those components as well.

A wide variety of different models may be used to predict the manifold and cam dynamics. In some models, simple or complex filters may be employed to predict the manifold and cam dynamics. In other implementations, a computational model may be used to calculate the manifold and cam dynamics in real time. In one particular embodiment, a manifold presser and/or air charge model such as the model described in co-pending U.S. patent application Ser. No. 13/794,157, which is incorporated herein by reference, may be used. In still other embodiments, lookup tables may be used to determine the predicted dynamics throughout a transition. Of course other approaches can be used as well.

The feed forward transition control approach described with respect to FIG. 2 can significantly smooth transitions in many applications. In general, the better the models used to estimate manifold pressure and cam timing match reality, the better the feed forward approach tends to work at smoothing transitions.

In practice, no model will be perfect and there are a variety of circumstances where unexpected disturbances may be encountered during operation that disrupt the actual manifold pressure, cam phase, etc. during a transition relative to what a model might predict. Often, various cost/benefit analyses and controller design choices may influence the nature and sophistication of the model used in any particular implementation.

Figure 3:
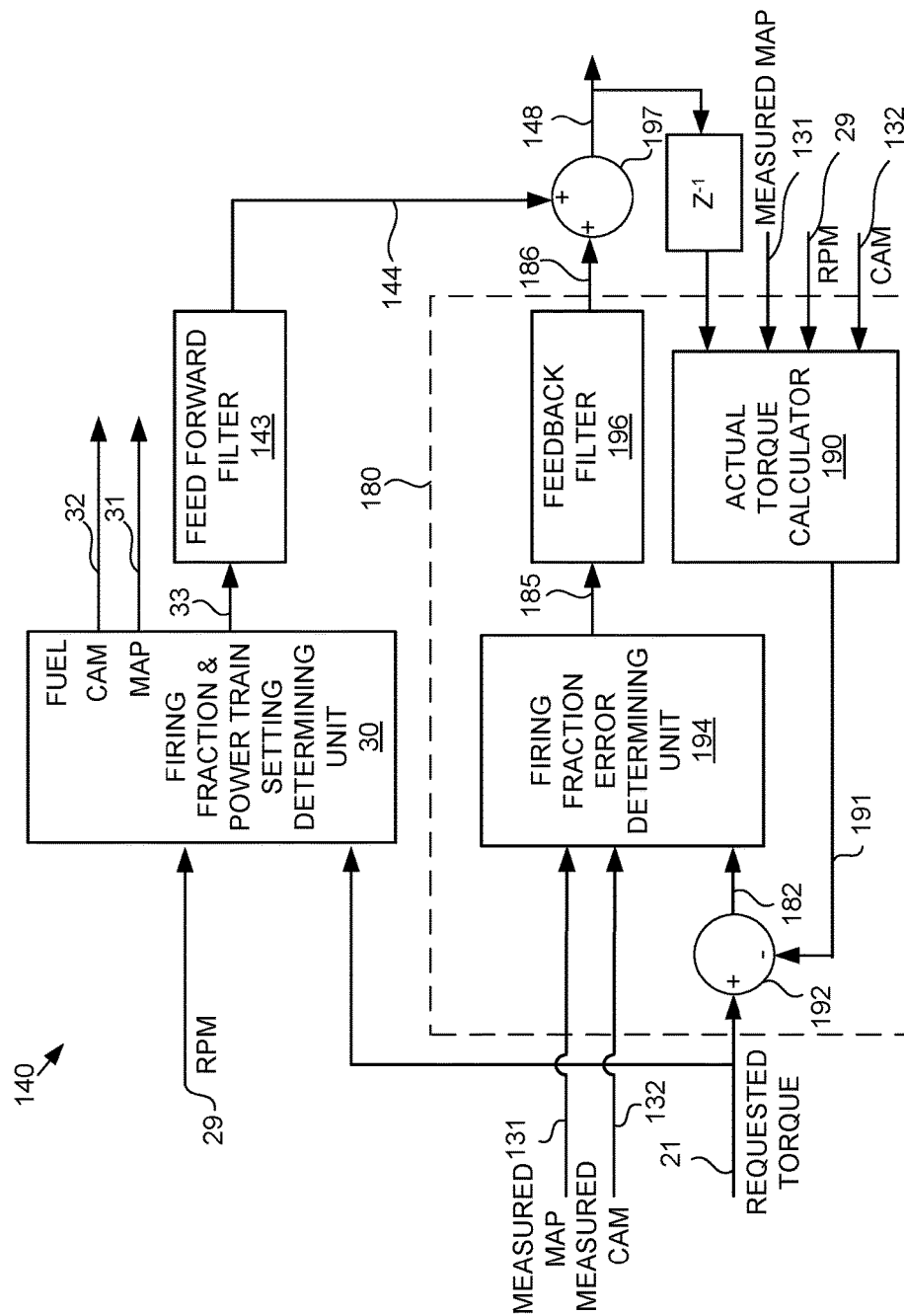
FIG. 3 is a functional block diagram highlighting selected control functionality of a transition management control unit that utilizes a combination of feed forward and feedback control to determine the transitory operational firing fraction during transitions between different commanded firing fractions.

Referring next to FIG. 3, which shows an alternative embodiment that incorporates both feed forward and feedback control in the determination of the adjusted firing fraction during transitions. More particularly, FIG. 3 illustrates a two degree of freedom transition adjustment unit 140 that utilizes both feed forward and feedback to determine the firing fraction during transition.

In the illustrated embodiment, the firing fraction and power train settings determining unit 30 is arranged to determine the firing fraction and engine settings that are appropriate for delivering the requested torque 21 in substantially the same manner as described above with respect to FIG. 1. When a firing faction transition is commanded, feed forward filter 143 adjusts the operational firing fraction 33 through the transition in a feed forward manner thereby providing a feed forward adjusted firing fraction 144. In some embodiments, the feed forward filter 143 may incorporate a relatively sophisticated transition adjustment component that explicitly attempts to account for manifold and cam dynamics as described above with respect to FIG. 2. In other embodiments, one or more filters static or variable configured in a manner that attempts to account for manifold, cam phase and/or other transition dynamics may be used as described, for example, in U.S. Pat. No. 9,086,020. In still other embodiments a variety of other approaches can be used to adjust the commanded firing fraction in an appropriate feed forward manner.

The transition adjustment unit 140 also has a feedback loop 180 that effectively determines any difference between the requested and actual torque (referred to herein as torque error 182) and utilizes the torque error to determine a firing fraction correction factor 185 that is combined with the feed forward adjusted firing fraction 144 to provide a modified firing fraction that serves as commanded firing fraction 148. In the illustrated embodiment, the feedback loop includes actual torque calculator 190, subtractor 192, firing fraction error determining unit 194 and a feedback filter 196.

Actual torque calculator 190 is arranged to determine/estimate the actual torque generated by the engine. As will be appreciate by those familiar with the art, the actual torque can be calculated using a variety of different inputs and models using known techniques. By way of example, the estimated actual torque can be calculated based on a set of inputs including as the commanded firing fraction 148, engine speed 29, the actual (measured) intake manifold pressure (MAP) 131, cam phase 132 and spark advance. In other embodiments, inputs such as crankshaft speed, acceleration or jerk, intake air mass air flow (MAF) may be utilized in the torque calculations. Of course a variety of other input sets can be used to estimate the actual torque in other embodiments. In the illustrated embodiment, the actual torque calculator 190 outputs an estimated actual torque 191 based on the measured manifold pressure and measured cam phase.

The estimated actual torque 191 is then compared to (e.g. subtracted from) the requested torque 21 as represented by subtractor 192 in FIG. 3. The difference is the torque error 182 which may be a positive or negative value. Firing fraction error determining unit 194 translates the torque error 182 into a corresponding firing fraction correction value at the current operating conditions. The firing fraction error may be calculated using a variety of different approaches. By way of example, one approach would be to calculate the amount of torque generated by each firing based in part on the measured MAP 131, the cam position 132 and engine speed 29. With this approach, the firing fraction error is the ratio between the torque error 182 and the torque generated by each firing. It should be appreciated that in the illustrated configuration, the firing fraction error will be a negative value if the actual torque output exceeds the requested torque 21 and positive if the actual torque is less than the requested torque. The firing fraction error is passed through a feedback filter 196 designed to coordinate feed forward and feedback outputs and filtered firing fraction error is summed with the feed forward adjusted firing fraction 144 by adder 197, which produces the feedback adjusted commanded firing fraction 148.

The use of a feedback loop that helps compensate for errors in the predicted manifold pressure and/or other operating parameters such as cam phase can significantly reduce torque variations over the course of a transition between firing fractions—which tends to reduce NVH associated with the transition thereby improving the perceived vehicle comfort. Even when a relatively simple filter or less robust (and potentially less expensive) feed forward models are used to determine the feed forward adjusted firing fraction 144, good drivability results can also be obtained when such feedback is used. Although particular logic is illustrated in FIG. 3, it should be appreciated that the specific feed forward and feedback loop logics can vary widely while providing the described functionality.

As will be familiar to those familiar with feedback control, the feed forward and feedback filters 143, 196 are designed to define the characteristics of the transient firing fraction. For example, using a low pass filter for feed forward filter 143 and a high pass filter with zero dc gain for the feedback filter 196 produces a commanded firing fraction 148 that stays at the feed forward firing fraction 144 during steady state, whereas during transitions where large torque errors occur, the firing fraction is corrected by the filtered firing fraction error 186. Of course, the filter design may be varied to define the desired transient firing fraction control. In one example, a filter as described in U.S. patent application Ser. No. 14/857,371 may be used. In general, the transfer functions of the filters define sensitivity of the firing fraction to transient torque error.

Figure 4:
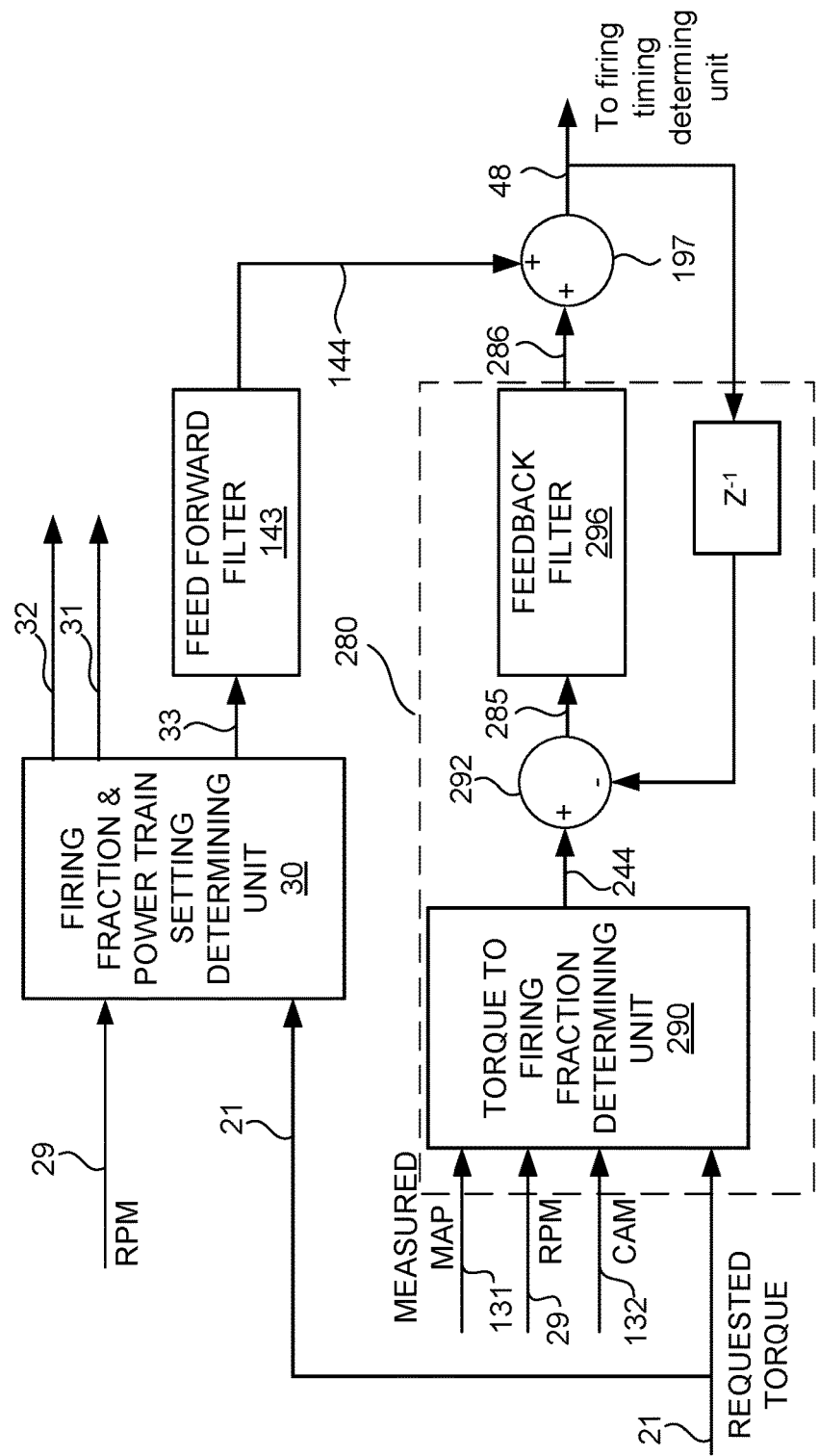
FIG. 4 is a functional block diagram of a simplified skip fire controller that utilizes a combination of feed forward and feedback control to determine the transitory operational firing fraction during transitions between different commanded firing fractions.

Referring next to FIG. 4, an alternative feedback embodiment will be described, which is a simplified equivalent to the controller shown in FIG. 3. In the illustrated embodiment, firing fraction and power train settings determining unit 30 and the feed forward path including feed forward filter 143 may operate substantially the same as described above with respect to FIG. 3 resulting in feed forward adjusted firing fraction 144. Feedback path 280 operates in parallel with the feed forward path. A transition firing fraction calculator 290 receives requested torque 21, the actual intake manifold pressure 131, the cam position 132 and engine speed 29. Based on these inputs, the transition firing fraction calculator 290 can determine a transition firing fraction 244 that will deliver the requested torque at the current values of the relevant engine operating parameters. It should be appreciated that when a transition is initiated, the actual manifold pressure 131 will often be different than the desired manifold pressure. When such a disparity occurs, the transition firing fraction 244 will typically be different than the requested firing fraction 33. Feedback of the commanded firing fraction 48 is subtracted from the transition firing fraction 244 by subtractor 292 which provides a firing fraction error 285. The firing fraction error 285 is passed through feedback filter 296 which provides filtered firing fraction error 286. The filtered firing fraction error 286 is summed in adder 197 with the feed forward adjusted firing fraction 144 to provide the commanded firing fraction 48, which in turn is passed to firing timing determining unit 50.

Figure 5:
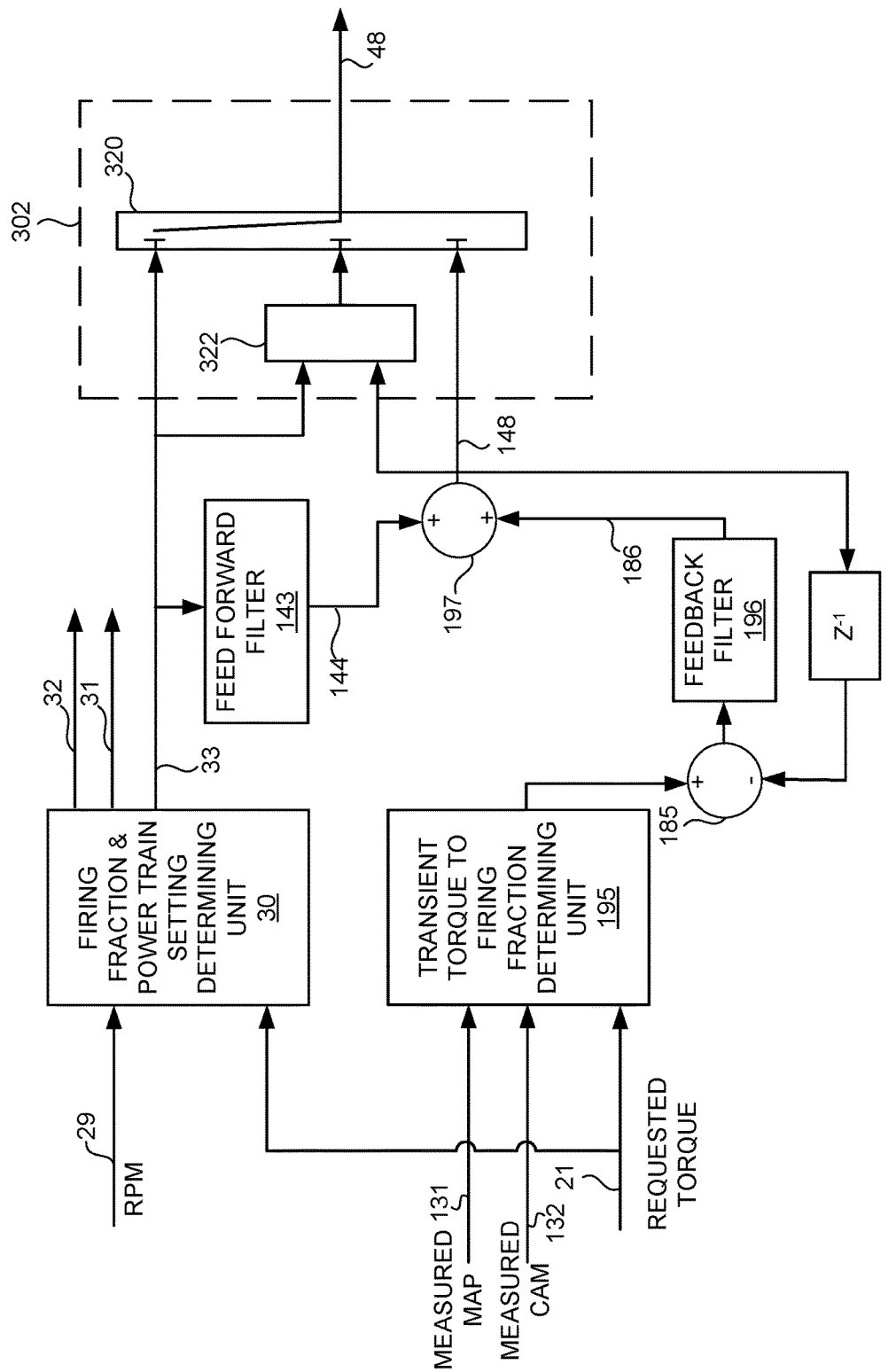
FIG. 5 is a functional block diagram of a mode switching embodiment of a skip fire controller that utilizes a combination of feed forward and feedback control to determine the transitory operational firing fraction during transitions between different commanded firing fractions.

Yet another embodiment is described with reference to FIG. 5. In this embodiment a feed forward/feedback controller with mode switching is provided. This embodiment has a base architecture that is substantially similar to the embodiment of FIG. 4. However, the requested firing fraction 33 and the feedback adjusted firing fraction 148 outputted from adder 197 are both inputted to mode switching unit 302. The mode switching unit 302 uses a switch 320 to select between these two inputs, outputting a commanded firing fraction 48. During steady state, requested firing fraction 33 is used as the commanded firing fraction 48. During transitions, the feedback adjusted firing fraction 148 is used as the commanded firing fraction 48. In other embodiments, the feed forward adjusted firing fraction 144 may be substituted for the requested firing fraction 33 and thus may be used during steady state operation. This works well because the feed forward adjusted firing fraction 148 is designed to equal the requested firing fraction during steady state operation.

During steady state, the feedback adjusted firing fraction 148 should also be very similar in value to the requested firing fraction 33, although the feedback adjusted firing fraction 148 may have some small oscillations due to residual zero-mean steady state torque variation which are undesirable (such variations may be due to inherent, combustion related, transient variations in MAP, cam phase and/or engine speed that occur during operation of the engine). Therefore, during steady state operation, the mode switching unit 302 selects the requested firing fraction 33. Then, once a firing fraction transition is detected, the output switches to the feedback adjusted firing fraction 148 which helps smooth the torque output during the transition. The mode switching unit 302 includes convergence detection module 322, which detects when the feedback adjusted firing fraction 148 converges with the requested firing fraction. Once convergence is detected, the output switches back to the requested firing fraction 33. A variety of conventional convergence detection circuit or algorithms can be used to detect convergence. By way of example, convergence detection that utilizes both the firing fraction value, and its first derivative works well. The thresholds used for each may be varied to meet the needs of any particular design. Convergence detection module 322 may include other logic in addition to a convergence circuit. For example, an additional input (not shown in FIG. 5) may be added to convergence detection module 322 to disable the feedback correction under certain conditions. For example, if the torque request is zero but the desired FF is not zero, disabling feedback prevents the correction term from adjusting the FF to zero. Such functionality may alternatively be provided by incorporation of this feature into firing fraction error determining unit 194 of FIG. 3.

In still other embodiments, a comb filter may be provided to help remove the combustion related transients in the feedback signal. Such a comb filter can be useful in embodiments both with and without convergence detection.

The effect of some of the different described control schemes can be seen by comparing the results of FIGS. 6, 7 and 8. FIGS. 6(*a*)-6(*d*) are a set of graphs showing several engine operating parameter responses during a representative increase in firing fraction from ⅓ to ½ using a representative feed forward transition management scheme. FIG.

Figure 6A:
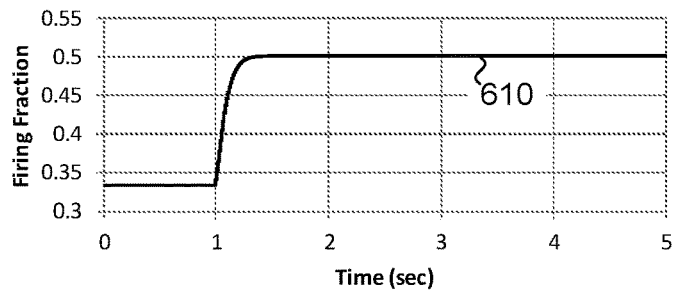
FIGS. 6(a)-6(d) are a set of graphs showing several engine operating parameter responses during a representative increase in firing fraction from $1/3$ to $1/2$ using a representative feed forward transition management scheme.
Figure 6B:
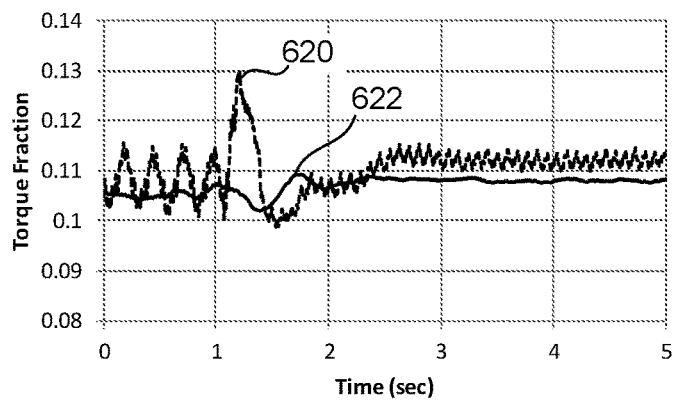
Figure 6C:
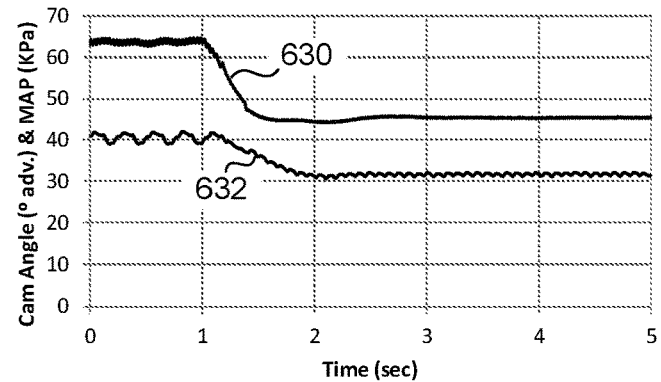
Figure 6D:
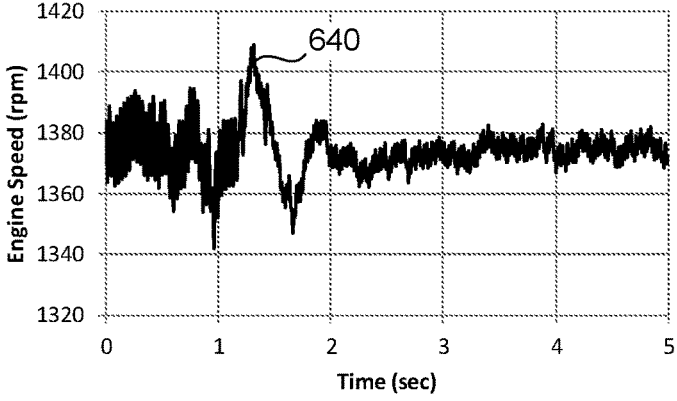
Figure 7A:
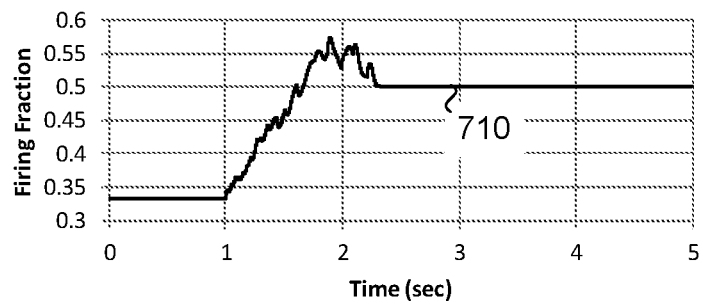
FIGS. 7(a)-7(d) are a set of graphs showing several engine operating parameter responses during a representative increase in firing fraction from $1/3$ to $1/2$ using a representative feed forward plus feedback transition management scheme using a first transition scheme.
Figure 7B:
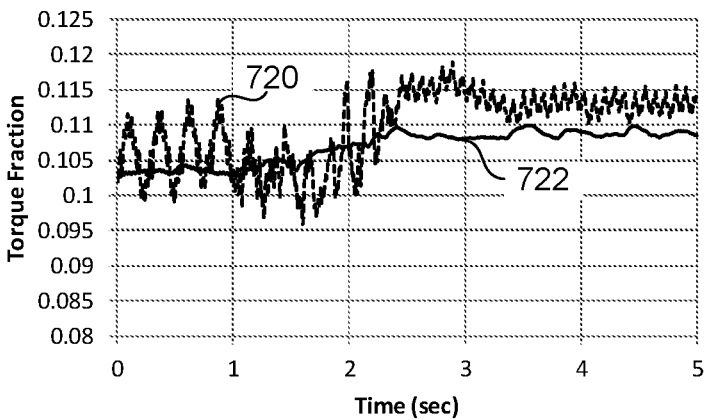
Figure 7C:
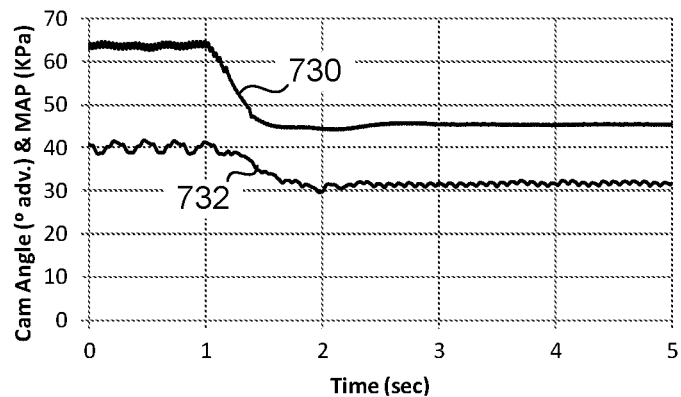
Figure 7D:
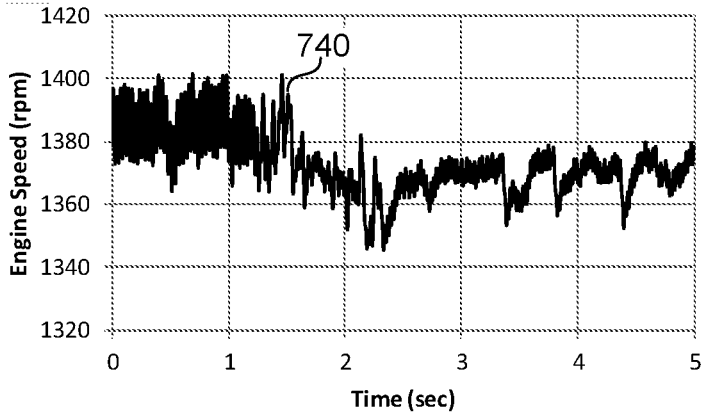
Figure 8A:
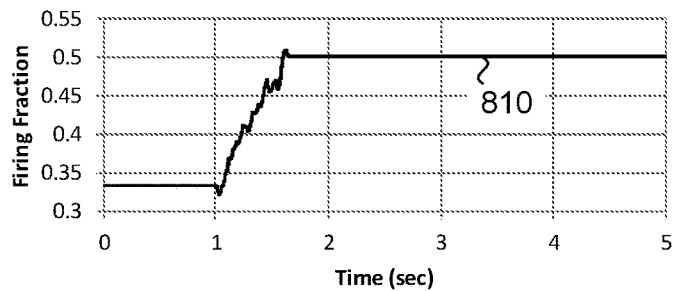
FIGS. 8(a)-8(d) are a set of graphs showing several engine operating parameter responses during a representative increase in firing fraction from $1/3$ to $1/2$ using a representative feed forward plus feedback transition management scheme using a second transition scheme.
Figure 8B:
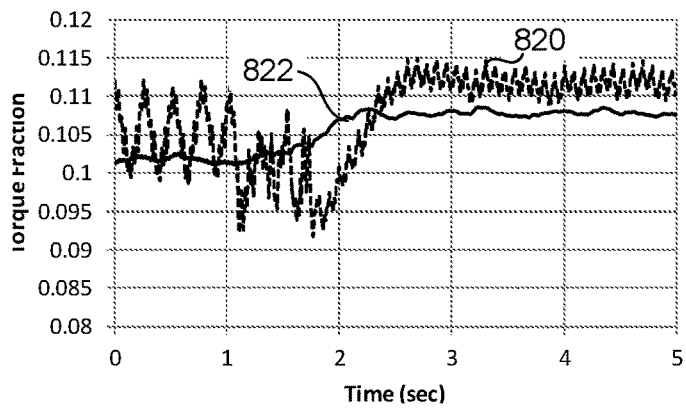
Figure 8C:
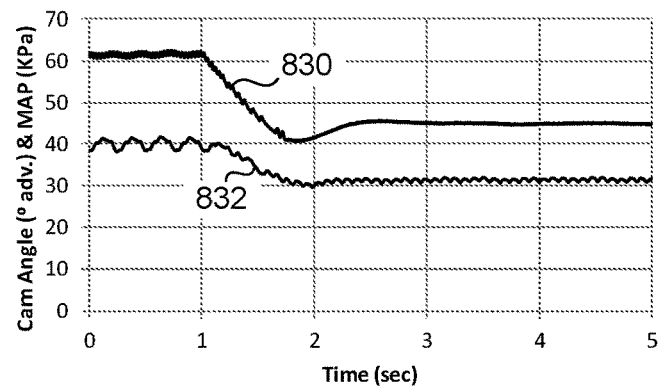
Figure 8D:
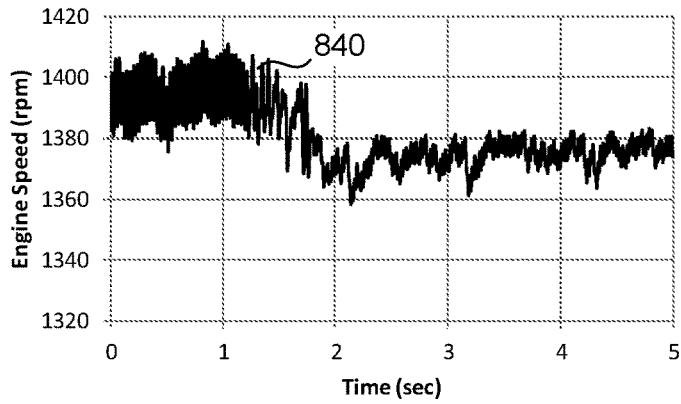

6(a) graphs the change in firing fraction 610. FIG. 6(b) graphs the estimated actual torque 620 as compared to the requested torque 622. FIG. 6(c) graphs the measured manifold pressure 630 and cam advance angle 632. FIG. 6(d) graphs the actual engine speed 640.

FIGS. 7(a)-7(d) and FIGS. 8(a)-8(d) are similar sets of graphs showing the engine operating parameter responses to the same transition for two different cases of a firing fraction transition with manifold pressure feedback based error correction as described. It can be seen that in either case, the torque error can be reduced during the transition which tends to help reduce undesirable NVH impacts associated with the transition. In these graphs, 710, 810 are the firing fraction, 720, 820 are the estimated actual torque, 722, 822 are the requested torque, 730, 830 are the measured MAP, 732, 832 are the measured cam advance, and 740, 840 are the engine speed.

During the course of any firing fraction transition, there may be a change in the requested operational firing fraction 33. That is, in the middle of a transition from a first firing fraction to a second firing fraction, there may be times when a second change request is made. In such a case, the transition adjustment unit may begin implementing the second change from the current state rather than waiting for the first transition to be completed. The target engine settings may also change during the course of a transition—either in conjunction with, or independent of a change in target firing fraction. The feed forward filter 143 is preferably arranged to handle such changes—although in practice such overlapping change requests tend to amplify the probability of torque disturbances that would occur based on the feed forward calculations. The described feedback loops help mitigate such torque disturbances.

There may also be changes in the requested torque during a transition. For example, during a firing fraction increase like FIG. 7a, the graphs shows only a slight increase in requested torque. However, if the torque request increases during the transition the filtered firing fraction error 186 (e.g.) would increase the adjusted firing fraction, increasing delivered torque and speeding the transition.

As suggested above, transitions are generally smoother when the torque delivered during the transition matches the desired torque. One of the prime reasons for controlling the firing fraction in conjunction with the air charge in the described manner is to help reduce torque variations—which tends to help reduce undesired vibrations. When air charge/firing fraction mismatches occur the output of the engine can sometimes be modulated in other manners. One such approach is to control the spark timing in a manner that mitigates such torque variations. Generally when operating at an allowed firing fraction level the spark timing is set at or near a timing that provides for optimum fuel efficiency, i.e. maximum torque for a given MAC, typically denoted as the maximum brake torque (MBT) operating point. When the firing fraction increases and the air charge is reduced, a torque surge would naturally occur if the firing fraction increases faster than the corresponding decrease in the air charge. This surge can be mitigated by retarding the spark appropriately during the transition in a manner that provides more steady torque output. In general, retarding the spark can reduce the output of each firing as is well understood by those familiar with the art.

An advantage of using spark timing control to help ensure that the engine provides the desired torque throughout the entire transition is that the spark is easy to control and can be adjusted very quickly. As suggested above, spark retard can be used to reduce the torque mismatch throughout an increasing firing fraction transition. In some cases spark retard alone may be sufficient to eliminate the mismatch; however, in other cases the air charge lag may be too great to be compensated by spark retardation without compromising combustion stability. In all cases an undesirable side effect of retarding spark to reduce engine output is that retarding spark will generally reduce fuel efficiency. Therefore, to the extent possible, it is generally preferable to match the air charge to the skipping fraction throughout the transition as described above to avoid, or at least reduce, the fuel efficiency losses associated with spark retard control.

It is typically harder to address torque dips using spark timing. However, if the spark timing prior to the transition did not correspond to the maximum torque timing, the spark can be advanced a limited amount to provide slightly more torque per firing, although knock, misfire considerations, etc. typically limit the practicality of using spark advance. While engines can be operated with non-optimal spark timing to provide a "torque reserve", operating with torque reserve results in lower fuel economy so use of torque reserve should be minimized or eliminated. Therefore, altering the spark timing is more useful in avoiding a torque surge than a torque dip.

In some circumstances, it may be desirable to try to accelerate the change in air charge following a commanded firing fraction change. One way to accelerate the change in air charge is to use so-called "bang-bang" type feed forward control of the throttle and/or cam phaser during transition. In other embodiments, more complex control schemes based on the throttle and/or cam phaser may be used to achieve a faster transition in the MAC. Some control schemes may integrate a two degree of freedom (2-DOF) control architecture that combines bang-bang type feed forward control with various types of feedback control, such as a PID (proportional, integral, differential) controller or state-space controller to maximize the tracking performance of MAC control while minimizing actuator busyness during steady state operation. In general, bang-bang feed forward throttle control contemplates opening or closing the throttle more than would be appropriate for steady state operation during the transition and then backing off to the level appropriate for steady state operation. Such control is described, for example, in U.S. patent application Ser. No. 14/857,371. The use of feedback of actual manifold pressure and/or cam phase in the determination of the adjustments to the firing fraction during the transition as described above can help mitigate the risk of torque surges or dips during such changes making more aggressive air control more practical.

Although only a few embodiments of the invention have been described in detail, it should be appreciated that the invention may be implemented in many other forms without departing from the spirit or scope of the invention. For example, most of the discussion above has focused on the use of a throttle and/or a cam phaser as the primary mechanisms to vary the air charge in each cylinder. As will be appreciated by those familiar with engine operation, there are a variety of other way to vary the air charge as well including other intake/exhaust valve timing control, valve lift control, exhaust gas recirculation techniques, air boosting techniques such as turbo-charging, supercharging, etc. When the engine includes suitable hardware, any of these air charge control mechanism can be controlled individually, or in parallel to better match the air charge to the firing density.

Some skip fire controllers are arranged such that they will inherently invoke a relatively large number of transitions under a variety of normal driving scenarios in an effort to maximize fuel economy. This is particularly true in driving conditions that support a relatively large set of firing fractions. By way of example, some driving tests by Applicant of a skip fire controller having up to 29 available firing fractions tend to average a transition every second or two during various normal driving profiles. For driving comfort, this makes it particularly desirable to utilize some of the transition management approaches described herein.

In the foregoing description, there are several references to the term, "cylinder." The term cylinder should be understood as broadly encompassing any suitable type of working chamber. The figures illustrate a variety of devices, designs and representative cylinder and/or engine data. It should be appreciated that these figures are intended to be exemplary and illustrative, and that the features and functionality of other embodiments may depart from what is shown in the figures.

The invention has primarily been described in the context of dynamic skip fire operation in which an accumulator or other mechanism tracks the portion of a firing that has been requested, but not delivered, or that has been delivered, but not requested. However the described techniques are equally applicable to managing transitions between any different skip fire firing fractions or between a skip fire firing fraction (in which individual cylinders are sometimes fired and sometime skipped) and all cylinder operation (or operation using a fixed set of cylinders) as may occur when using various rolling cylinder deactivation techniques. Similar techniques may also be used to manage effective displacement transitions in variable stroke engine control in which the number of strokes in each working cycle are altered to effectively vary the displacement of an engine.

The control schemes described herein and the individual cylinder control concepts used in dynamic skip fire can also be applied to other engine control methods that may have significantly different torque signatures associated with sequential firing opportunities. One such example is dynamic multi-charge level engine operation in which all cylinders are fired, but individual working cycles are purposely operated at different cylinder output levels. Dynamic skip fire, dynamic multi-charge level engine operation, and dynamic multi-level skip fire engine operation may collectively be considered different types of dynamic firing level modulation engine operation in which the output of each working cycle (e.g., skip/fire, high/low, skip/high/low, etc.) is dynamically determined during operation of the engine, typically on an individual cylinder working cycle by working cycle (firing opportunity by firing opportunity) basis. Thus, the described control schemes can be useful in managing transitions between different firing levels during dynamic, multi-level engine operations (e.g., managing significant air charge changes through changes in valve lift, cam phase or the like) and/or in any other dynamic firing level modulation engine control scheme.

When the use of multiple non-zero firing levels is contemplated, it is often efficient to consider an effective firing fraction which correlates to the percentage or fraction of the cylinders that would be fired at a high or reference output. For example, if half of the cylinders are fired at a cylinder output level of 70% of a full firing output and the other half are fired at the full firing output level, then the effective firing fraction would be 85%. In another example, if a quarter of the cylinders are fired at a cylinder output level of 70% of a full firing output, another quarter are fired at the full firing output level, and the other half are skipped, then the effective firing fraction would be 42.5%. In yet another example, if traditional skip fire operation is used (i.e., firing a designated percentage of the firing opportunities), then the effective firing fraction may represent the percentage of the cylinders that are actually fired.

Generally, the effective firing fraction may be used in place of the firing fraction in any of the previously described control methods or systems. Rather than being limited to making a skip/fire decision for every firing opportunity, the control system may choose between firings having different torque signatures (dynamic multi-charge level engine operation) or firing opportunities having more than two choices for the torque signature, i.e. skip/low/high (dynamic multi-level skip fire engine operation).

The described methods and arrangements may also be integrated into a hybrid powertrain where the crankshaft may be driven by a combination of an internal combustion engine and some auxiliary power source, such as an electric motor. In general, the auxiliary power source may at various times add or subtract torque from the powertrain crankshaft depending on the control settings. For example, an electric motor may at times be used as an electric generator to store energy from the powertrain in an energy storage device such as a capacitor or a battery.

The present invention may also be useful in engines that do not use skip fire control. For example, although the invention is described primarily in the context of transitions between different firing fractions during skip fire control, the described techniques can also be used to facilitate transitions between different variable displacement states in more traditional variable displacement engines using a skip fire transition approach. For example, an eight cylinder variable displacement engine that has the ability to operate in a 4 cylinder mode (i.e., 4 fixed cylinders) will require transitions from a firing fraction of 0.5 to 1 and vice versa and could advantageously use the firing fraction transition management techniques described herein. Therefore, the present embodiments should be considered illustrative and not restrictive and the invention is not to be limited to the details given herein.

The Applicant has previously filed several patents and patent applications related to the management of transitions between discrete firing fractions. These include U.S. patent application Ser. No. 13/654,248 (P011B) filed Oct. 17, 2012 and Ser. No. 14/857,371 (P041) filed Sep. 17, 2015, each of which are incorporated herein by reference.

The invention claimed is:

1. A method of controlling the transition of an engine between different effective firing fractions, the method comprising:

while the engine is operating at a first effective firing fraction using a first value for an operating parameter that affects working chamber air charge, determining a target value for the operating parameter that is different than the first value, and a target effective firing fraction selected to deliver a requested engine output;

transitioning from the first firing effective fraction to the target effective firing fraction;

during the transition, determining a feed forward adjusted effective firing fraction that at least partially compensates for engine dynamics that occur during the change from the initial value for the operating parameter to the target value for the operating parameter, wherein the feed forward adjusted effective firing fraction changes over the course of the transition;

during the transition, determining an effective firing fraction correction factor indicative of a difference between an actual engine output and the requested engine output, wherein the effective firing fraction correction factor potentially varies over the course of the transition;

determining a commanded effective firing fraction during the transition that combines the effective firing fraction correction factor with the feed forward adjusted effective firing fraction; and directing dynamic firing level modulation operation of the engine utilizing the commanded effective firing fraction during the transition, whereby the commanded effective firing fraction changes over the course of the transition.

2. A method as recited in claim 1 wherein the effective firing fraction correction is part of a feedback loop.

3. A method as recited in claim 1 wherein the operating parameter that affects air charge includes at least one of:
intake manifold pressure, whereby the feed forward adjusted effective firing fraction at least partially compensates for manifold filling or emptying dynamics that occur during the change from the first value of the intake manifold pressure to the target value of the intake manifold pressure;
intake manifold mass air flow, whereby the feed forward adjusted effective firing fraction at least partially compensate for intake manifold mass air flow dynamics that occur during the change from the first value of the intake manifold mass air flow to the target value of the intake manifold mass air flow; and
camshaft phase, whereby the feed forward adjusted effective firing fraction at least partially compensates for camshaft phase shifting dynamics that occur during the change from the first value of the camshaft phase to the target value of the camshaft phase.

4. A method as recited in claim 3 wherein the feed forward adjusted effective firing fraction at least partially compensates for both camshaft phase shifting dynamics and manifold filling or emptying dynamics.

5. A method as recited in claim 1 wherein the commanded effective firing fraction is an input to a sigma delta based firing timing determining unit that determines the timing and magnitude of firings during dynamic firing level modulation operation of the engine.

6. A method as recited in claim 1 wherein the effective firing fraction correction factor is determined based at least in part on a sensed intake manifold pressure (MAP) or a sensed intake manifold mass air flow (MAF).

7. A method as recited in claim 6 wherein the effective firing fraction correction factor is further determined at least in part based on a sensed camshaft phase.

8. A method as recited in claim 1 wherein the commanded effective firing fraction is utilized by a firing timing determining unit to determine the timing of firings during dynamic firing level modulation operation of the engine, the firing timing determining unit having an accumulator functionality that tracks the portion of a firing that has been requested but not delivered, or that has been delivered but not requested.

9. A method as recited in claim 1 wherein when the requested engine output changes over the course of the transition, at least one of the target value for the operating parameter and the target effective firing fraction is changed accordingly.

10. A method as recited in claim 1 wherein the target effective firing fraction is selected from a predefined set of available effective firing fractions.

11. A method as recited in claim 1 wherein the method is performed during dynamic multi-charge level operation of the engine.

12. A method as recited in claim 1 wherein the operating parameter that affects air charge includes at least two of:
intake manifold pressure;
camshaft phase;
intake valve lift; and
exhaust gas recirculation.

13. A method as recited in claim 1 wherein the intake manifold pressure is boosted by at least one of a turbocharger and a supercharger.

14. A method as recited in claim 1 wherein the effective firing fraction correction factor tends towards zero.

15. A method as recited in claim 1 wherein the method is performed during multi-level skip fire operation of the engine.

16. A method of controlling the transition of an engine between different effective firing fractions, the method comprising:
while the engine is operating at a first effective firing fraction using a first value for an operating parameter that affects working chamber air charge, determining a target value for the operating parameter that is different than the first value, and a target effective firing fraction selected to deliver a requested engine output, the target effective firing fraction being different than the first effective firing fraction;
transitioning from the first effective firing fraction to the target effective firing fraction, wherein during the transition, the method further includes,
(i) determining an effective firing fraction correction factor indicative of a difference between an actual engine output and the requested engine output, wherein the effective firing fraction correction factor potentially varies over the course of the transition;
(ii) determining a commanded effective firing fraction that combines the effective firing fraction correction factor with the target effective firing fraction; and
(iii) directing dynamic firing level modulation operation of the engine during the transition utilizing the commanded effective firing fraction.

17. A method as recited in claim 16 wherein the effective firing fraction correction factor is determined based at least in part on at least one of:
a sensed intake manifold pressure (MAP);
a sensed intake manifold mass air flow (MAF); and
a sensed camshaft phase.

18. A method as recited in claim 16 wherein the operating parameter that affects air charge includes at least one of:
intake manifold pressure; and
camshaft phase.

19. A method as recited in claim 16 wherein the method is performed during dynamic multi-charge level operation of the engine.

20. A method as recited in claim 16 wherein the method is performed during multi-level skip fire operation of the engine.

21. An engine controller arranged to direct dynamic firing level modulation operation of an engine, the engine controller comprising:
a firing fraction determining unit arranged to determine a desired operational effective firing fraction suitable for delivering a desired engine output, wherein the desired operational effective firing fraction changes based at least in part on changes in the desired engine output;

a transition adjustment unit arranged to adjust the desired effective operational firing fraction during transitions from a first operational effective firing fraction to a target operational effective firing fraction; and a firing timing determining unit arranged to determine a firing sequence that delivers a commanded effective firing fraction; and wherein the transition adjustment unit includes, a feed forward effective firing fraction determining unit that determines a feed forward adjusted effective firing fraction that at least partially compensates for engine dynamics that occur during the change from the first operational effective firing fraction to the target operational effective firing fraction, wherein the feed forward adjusted effective firing fraction changes over the course of the transition, and an error determining unit that determines an effective firing fraction correction factor based at least in part upon a difference between an estimated or actual engine output and the requested engine output, wherein the effective firing fraction correction factor potentially varies over the course of the transition, and wherein the transition adjustment unit is configured to determine the commanded effective firing fraction during transitions based at least in part on the feed forward adjusted effective firing fraction and the effective firing fraction correction factor.

22. An engine controller as recited in claim 21, further comprising a mode switching unit arranged to cause the desired operational effective firing fraction to be used as the commanded effective firing fraction during steady state dynamic firing level modulation engine operation and an output of the transition adjustment unit to be used as the commanded effective firing fractions during effective firing fraction transitions.

23. An engine controller as recited in claim 21 wherein at least one of a measured cam phase, a measured manifold pressure, and a measured mass air flow is used in the determination of the actual engine output.

24. An engine controller as recited in claim 23 wherein the actual engine output is determined based at least in part on a measured intake manifold pressure, a measured intake manifold mass air flow, a cam phase angle, spark timing and engine speed.

25. An engine controller as recited in claim 21 wherein the engine controller is arranged to direct dynamic multi-charge level operation of the engine.

26. An engine controller arranged to direct firing level modulation operation of an engine, the engine controller comprising:

a firing fraction determining unit arranged to determine a desired operational effective firing fraction suitable for delivering a desired engine output, wherein the desired operational effective firing fraction changes based at least in part on changes in the desired engine output;

a transition adjustment unit arranged to adjust the desired operational effective firing fraction during transitions from a first operational effective firing fraction to a target operational effective firing fraction;

a mode switching unit arranged to cause the desired operational effective firing fraction to be used as a commanded effective firing fraction during steady state engine operation and an output of the transition adjustment unit to be used as the commanded effective firing fractions during effective firing fraction transitions; and a firing timing determining unit arranged to determine a firing sequence that delivers a commanded effective firing fraction.

27. An engine controller as recited in claim 26 wherein the transition adjustment unit includes, a feed forward effective firing fraction determining unit that determines a feed forward adjusted effective firing fraction that at least partially compensates for engine dynamics that occur during the change from the first operational effective firing fraction to the target operational effective firing fraction, wherein the feed forward adjusted effective firing fraction changes over the course of the transition, and an error determining unit that determines an effective firing fraction correction factor based at least in part upon a difference between an actual engine output and the requested engine output, wherein the effective firing fraction correction factor potentially varies over the course of the transition.

28. An engine controller as recited in claim 27 wherein at least one of a measured cam phase and a measured manifold pressure is used in the determination of the actual engine output.

29. An engine controller as recited in claim 26 wherein the engine controller is arranged to direct dynamic multi-charge level operation of the engine.

* * * * *